No. 738,524. PATENTED SEPT. 8, 1903.
M. CASSIDY.
RACE HORSE STARTER.
APPLICATION FILED MAR. 26, 1902.
NO MODEL. 3 SHEETS—SHEET 1.
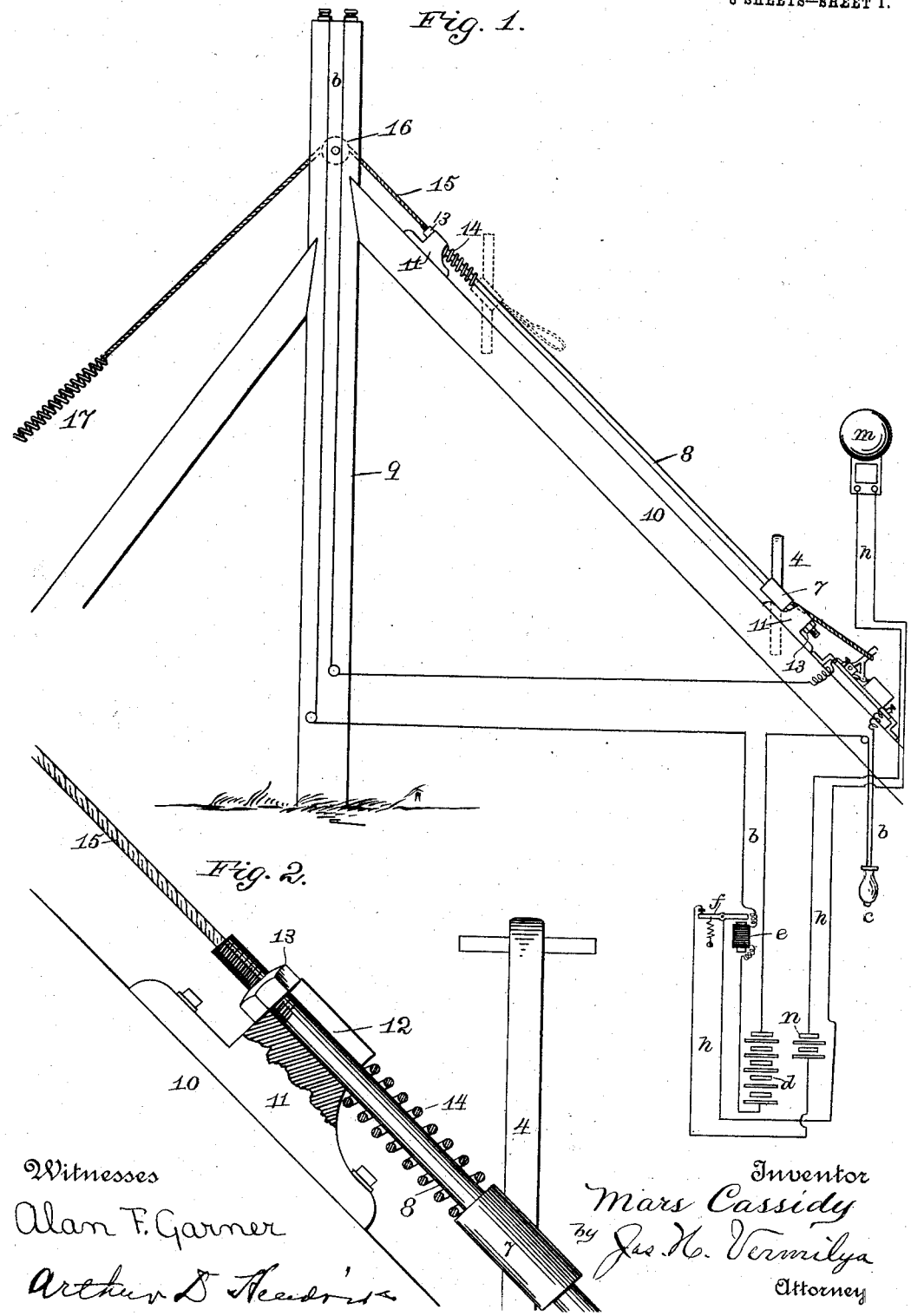
Witnesses
Alan F. Garner
Arthur D. Hendrick
Inventor
Mars Cassidy
by Jas. H. Vermilya
Attorney No. 738,524. PATENTED SEPT. 8, 1903.
M. CASSIDY.
RACE HORSE STARTER.
APPLICATION FILED MAR. 26, 1902.
NO MODEL. 3 SHEETS—SHEET 2.
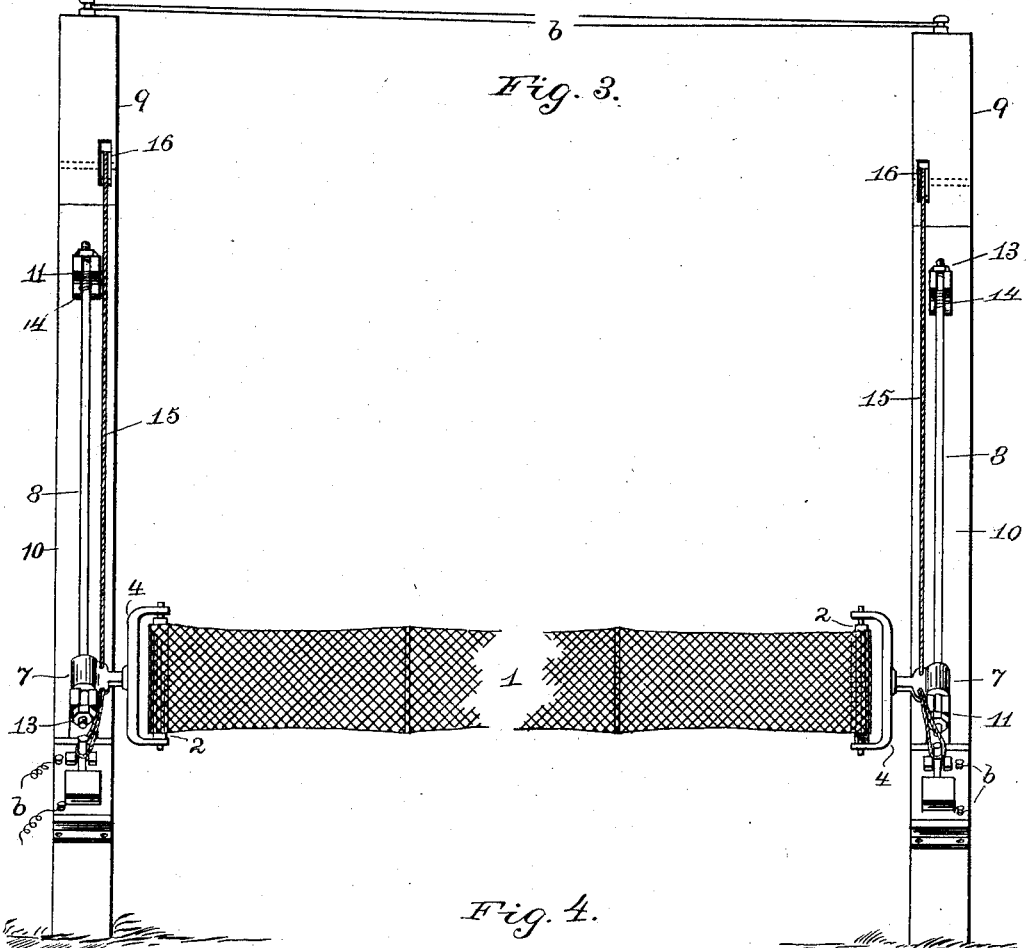
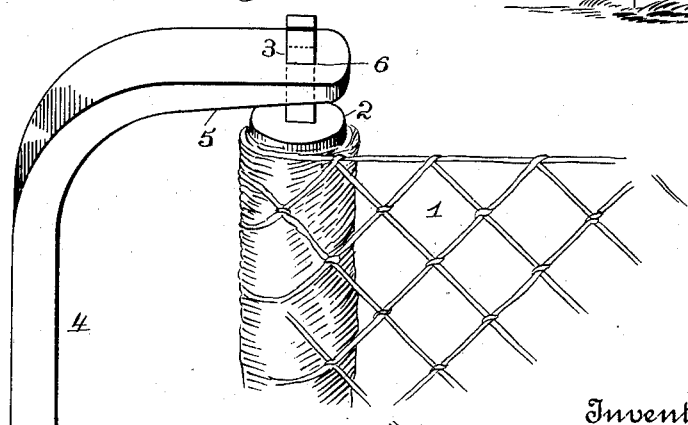
Witnesses
Alan F. Garner
Arthur D. Hendricks
Inventor
Mars Cassidy
by Jas. H. Vermilya
Attorney No. 738,524. PATENTED SEPT. 8, 1903.
M. CASSIDY.
RACE HORSE STARTER.
APPLICATION FILED MAR. 26, 1902.
NO MODEL. 3 SHEETS—SHEET 3.
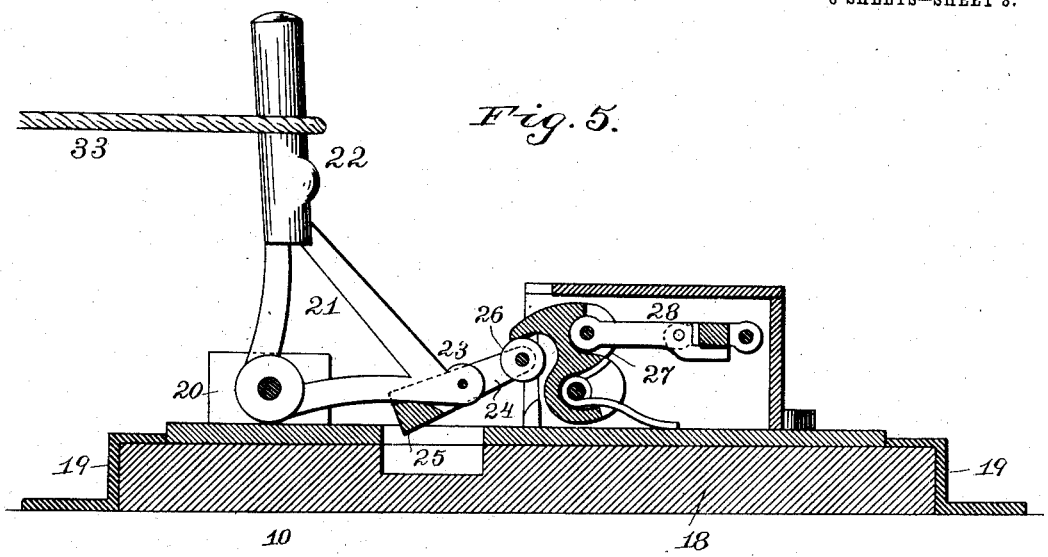
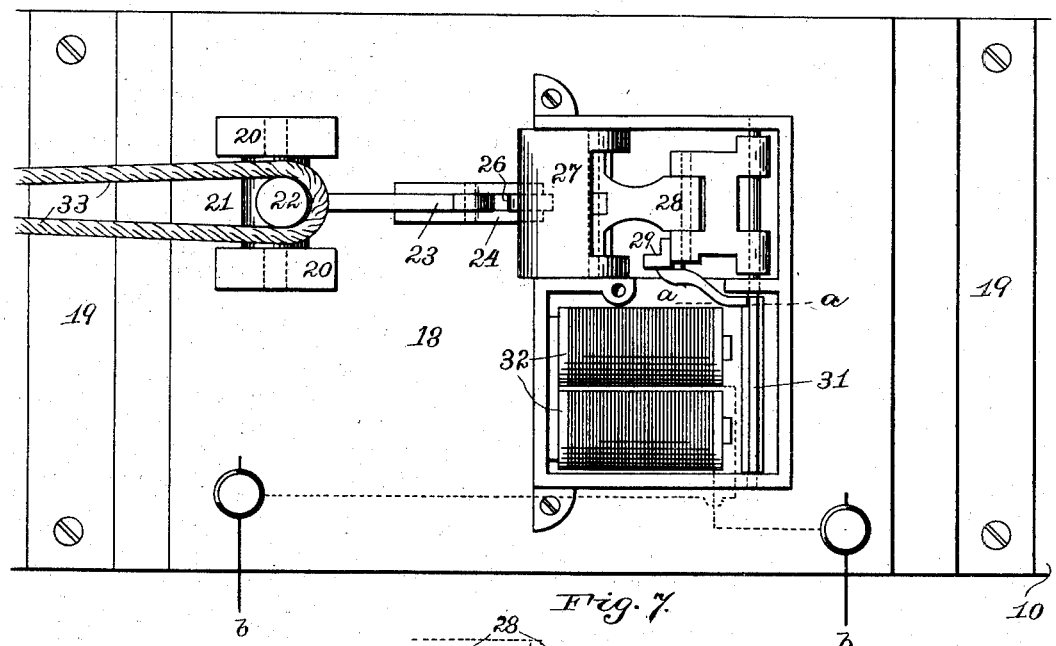
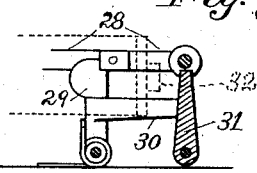
Witnesses
Alan F. Garner
Arthur D. Heedrid
Inventor
Mars Cassidy,
by Jas. H. Vermilya
Attorney No. 738,524. Patented September 8, 1903.

UNITED STATES PATENT OFFICE.

MARS CASSIDY, OF WASHINGTON, DISTRICT OF COLUMBIA.

RACE-HORSE STARTER.

SPECIFICATION forming part of Letters Patent No. 738,524, dated September 8, 1903.

Application filed March 26, 1902. Serial No. 100,140. (No model.)

*To all whom it may concern:*

Be it known that I, MARS CASSIDY, of Washington, District of Columbia, have invented a new and useful Improvement in Race-Horse Starters, of which the following is a full, clear, and exact description, reference being had to the accompanying drawings, making part of this specification.

This invention is an improved race-horse starter of that class in which a light barrier of slight construction is stretched across the race-track at the starting-point in front of the horses to get them in line and insure an even start, in connection with means for suddenly and instantaneously raising the barricade immediately prior to the start, so that the horses run under it; and it consists in a novel construction and combination of devices, hereinafter fully described, and specifically pointed out in the appended claims.

In the accompanying drawings, Figure 1 is a side elevation of a race-horse starter embodying my improvements, and in which the circuits of the electric apparatus employed for releasing the barrier and for sounding an electric gong announcing that the barrier is released are illustrated diagrammatically. Fig. 2 is a detail elevation, partly in section, showing a portion of one of the guide-rods and one of the brackets in which the same is detachably secured. Fig. 3 is a front elevation of the starter, showing the barrier lowered and stretched across the track. Fig. 4 is a detail elevation in perspective showing a portion of the barrier and one of the heads which carry it. Fig. 5 is a detail sectional view showing the releasing mechanism. Fig. 6 is a top plan view of the same. Fig. 7 is a diagrammatic detail sectional view taken on the plane indicated by the line *a a* of Fig. 6.

The barrier 1 is preferably a light netting of suitable length and width, and the ends thereof are wrapped on cores 2, which are preferably wooden cylinders and are provided at their ends with projecting trunnions 3, which are angular in cross-section. Heads 4, which are preferably made of aluminium and vertically disposed, are provided with laterally-disposed spring-arms 5 on their respective inner sides, which spring-arms have angular openings 6 to receive the trunnions 3, and thus enable the barrier to be detachably secured to the heads. It will be understood that when the cores are detached from the heads the barrier may be rolled on or unrolled from the cores to lengthen or shorten the barrier, as may be required by the width of the race-track across which the same is to be stretched. It will be further understood that the angular openings 6 of the spring-arms and the angular trunnions of the cores prevent the latter from rotating when in position in the heads. Each head has on its outer side at its center a slide 7. The latter operate on guide-rods 8.

On opposite sides of the track at the starting-point are posts 9. The same are here shown on the sides from which the horses start as provided with inclined braces 10. On the upper sides of these braces are bolted or otherwise secured brackets 11, which have longitudinal slots 12 open on their upper sides. The guide-rods are disposed in the said slots from which they may readily be removed, and nuts 13 are screwed on the ends of the guide-rods and by bearing against the outer ends of the upper and lower brackets 11 secure the guide-rods to the said brackets and enable the guide-rods to be rendered as tense as may be required to keep them perfectly straight and adapt the slides 7 of the heads which carry the barrier to readily travel longitudinally on the guide-rods, so that the barrier may be lowered or raised. In practice the slides may be lined with graphite to reduce friction or may be provided with bearing-balls for the same purpose. It is of the utmost practical importance that the slides be enabled to move readily and swiftly on the guide-rods, in order that the barrier may be raised with such speed that the horses may race under it. The guide-rods should be kept polished and absolutely free from rust. My provision of the open-slotted brackets and the nuts on the ends of the guide-rods enables the latter to be readily applied to the brackets and to be as readily removed therefrom, so that the guide-rods may be stored when the starter is not in use and prevented from rusting by exposure to the weather. I also employ buffer-springs 14, which are here shown as coiled springs, disposed on the upper portions of the guide-rods. Their function is to prevent injurious concussion when the slides reach the upper portions of the guide-rods in raising the barrier. Operating-cords 15 are attached to the slides, pass over direction-sheaves 16, mounted near the upper ends of the posts, and springs 17 are attached to the said cords, the function of the springs being to draw upon the cords when the heads are released, and thereby instantly raise the barrier by moving the heads upwardly on the guide-rods. In practice I find that rubber springs are most suitable for this purpose; but coiled retractile springs are here indicated for the purpose of illustration.

The releasing mechanisms are mounted on bases 18, which are removably secured on the upper sides of the braces 10 at a suitable distance from the lower ends thereof. The said braces are provided with flange-bars 19, disposed transversely thereon, and the bases are inserted between the flange-bars on the braces, the flange-bars serving to retain the bases on the braces and yet permitting them to be readily removed therefrom, as will be understood.

I will now describe my improved releasing mechanisms.

On each of the bases 18 are a pair of lugs 20, between which is pivoted a releasing-trigger 21. Said triggers are preferably of the form shown in Fig. 5, having each an outwardly and upwardly projecting handle 22 and an arm 23 at right angles thereto or approximately so. To the outer end of the arm 23 of each trigger is pivoted a link-arm 24, the inner end of which extends under the arm 23 and has a stop 25 to contact therewith, and thereby limit the pivotal movement of the arm 24 in one direction, and each link-arm 24 has at its outer end an antifriction-roller 26 to engage a pivoted locking-bolt 27. The said locking-bolts are normally held in the engaged position with relation to the releasing-triggers by toggle-jointed links 28 and catches 29. Each of the latter has an arm 30, disposed in the path of a pivoted armature 31. Electromagnets 32 are provided to attract the armatures when the said magnets are energized, and thereby by operating the catches trip the latter from the toggle-jointed links, and hence enable the bolts to turn in such manner as to disengage the rollers 26, and hence release the triggers. When the barrier is lowered, the slides of the heads 4 are connected to the handles of the triggers by loops 33 and the triggers turned to the position shown in Figs. 5 and 6, thereby engaging the rollers 26 with the bolts 27, and the latter hold said triggers in this position against the tension of the springs 17.

The electromagnets 32 of the respective releasing devices on opposite sides of the track are connected together by an electric circuit $b$, including a push-button $c$, a battery $d$, and an electromagnet $e$. Hence when the button is pressed by the person whose business it is to see that the horses are started evenly the magnets 32 at both sides of the track are simultaneously energized, causing the bolts 27 to be released, and the tension of the springs 17, through the connections hereinbefore fully described, causes the triggers 21 to be disengaged from the bolts and the barrier to be raised so quickly that the horses cannot run against it. The electromagnet $e$ also becomes simultaneously energized. This electromagnet attracts a circuit-closing armature $f$, included in open circuit $h$, with an electric gong $m$, and hence as the barrier is released the circuit $h$ is closed by the armature $f$, and a battery $n$ being in said circuit $h$ the gong is sounded, which is a signal for the horses to start.

I do not desire to limit myself to the precise construction and combination of devices herein shown and described, as it is obvious that modifications may be made therein without departing from the spirit of my invention and within the scope of the appended claims.

Having thus described my invention, I claim—

1. In a race-horse starter, the combination with brackets, having open slots, of guide-rods detachably placed in said slots, and clamping and adjusting nuts on said guide-rods, to engage the said brackets, substantially as described.

2. In a race-horse starter, the combination of a barrier, guides therefor, means to raise the barrier, pivoted releasing-triggers having fixed supports, to retain the barrier in a lowered position, bolts to lock the triggers in engaged position, and means, including electromagnetically-operated catches, to lock the bolts in engaged position, whereby when the catches are tripped, the bolts are disengaged from the triggers by the pull of the means to raise the barrier, substantially as described.

3. In combination with a barrier and means to move the same out of the way, means, including an electromagnetically-operated device, to retain the barrier in position to obstruct the way, an electric signaling device, and an electric circuit, including an element of said magnetically-operated device, for operating the signal, substantially as described.

4. In a race-horse starter, the combination of a barrier, supports therefor, guides for the barrier, detachably secured on the supports, bases also removably attached to the supports, triggers to hold the barrier in a lowered position, and holding means for the triggers, both secured upon the bases and removable therewith, substantially as described.

5. In a race-horse starter, the combination with a barrier and means to operate the same, of a pivoted trigger to hold the barrier in a closed position and having a fixed support, a lock to engage the trigger, a catch to detain the lock in engaged position with the trigger, means, including an electromagnet, to trip the catch, an electromagnetically-operated circuit-closer, in circuit therewith, and an electrically-operated signaling device in circuit with an element of the circuit-closer, substantially as described.

6. In a race-horse starter, the combination of a barrier and means to operate the same, an electrically-operated signaling device, an electrically-operated circuit-closer in circuit therewith and controlling the same, an electrically-operated barrier-releasing element, an electric circuit including the same and an element of said circuit-closer, and a circuit-closer for the last-mentioned circuit, for the purpose set forth, substantially as described.

7. In a race-horse starter, the combination of a barrier, means to operate the same, pivoted triggers having fixed supports, to engage and detain the barrier in a closed position, locks for the triggers, and means to simultaneously disengage the locks from the triggers to release the barrier, substantially as described.

8. The combination of a movable barrier and means to operate it, with mutually-engaging releasing and locking devices, to hold the barrier in a closed position and simultaneously movable in diverging paths while disengaging each other and releasing the barrier, substantially as described.

9. The combination with a movable barrier and means to operate it, of mutually-engaging releasing and locking devices, to hold the barrier in a closed position and simultaneously angularly movable while releasing the barrier, substantially as described.

10. The combination with a movable barrier and means to operate it, of mutually-engaging pivoted releasing and locking elements, to hold the barrier in a closed position, and simultaneously pivotally movable while disengaging each other to release the barrier, substantially as described.

In testimony whereof I have set my hand, this 24th day of March, A. D. 1902, in the presence of two attesting witnesses.

MARS CASSIDY.

Witnesses:
 JNO. T. MEANY,
 ROWEN EDMONSTON.